(12) United States Patent
Fang et al.

(10) Patent No.: US 7,181,102 B1
(45) Date of Patent: Feb. 20, 2007

(54) OPTICAL SWITCHING SYSTEMS AND METHODS

(75) Inventors: Zuyun Fang, Henderson, NV (US); Jianhua Wang, Saratoga, CA (US)

(73) Assignee: OptiWorks, Inc., Fremont, CA (US)

( * ) Notice: Subject to any disclaimer, the term of this patent is extended or adjusted under 35 U.S.C. 154(b) by 176 days.

(21) Appl. No.: 10/851,553

(22) Filed: May 21, 2004

(51) Int. Cl.
*G02B 6/26* (2006.01)

(52) U.S. Cl. .......................... 385/16; 385/15; 385/17; 385/18

(58) Field of Classification Search ............ 385/15–18
See application file for complete search history.

(56) References Cited

U.S. PATENT DOCUMENTS

| | | | |
|---|---|---|---|
| 4,671,613 A * | 6/1987 | Buhrer | 359/495 |
| 5,867,617 A | 2/1999 | Pan et al. | |
| 5,999,669 A | 12/1999 | Pan et al. | |
| 6,574,385 B2 | 6/2003 | Irwin | |
| 6,640,022 B2 * | 10/2003 | Yang | 385/16 |
| 6,904,223 B1 * | 6/2005 | Fang et al. | 385/140 |

OTHER PUBLICATIONS

U.S. Appl. No. 10/802,126, Fang.

* cited by examiner

*Primary Examiner*—Jennifer Doan
(74) *Attorney, Agent, or Firm*—Law Office of Andrei D. Popovici, P.C.

(57) ABSTRACT

In some embodiments, a 1×N optical switch includes: a plurality of co-planar, parallel output optical fiber collimators oriented to receive light substantially perpendicular to a longitudinal direction; and a plurality of switching units each corresponding to an output collimator. Each switching unit includes a rhomboid switching prism movable between a first position and a second position, and a fixed right-angle reflector facing the output collimator. When the switching prism is in the first position, the switching prism receives a longitudinal light beam and directs the light beam to the reflector for transmission to the output collimator. When the switching prism is in the second position, the switching prism is situated out of a path of the light beam. The described configurations may be optically reversed to yield N×1 switches.

26 Claims, 4 Drawing Sheets

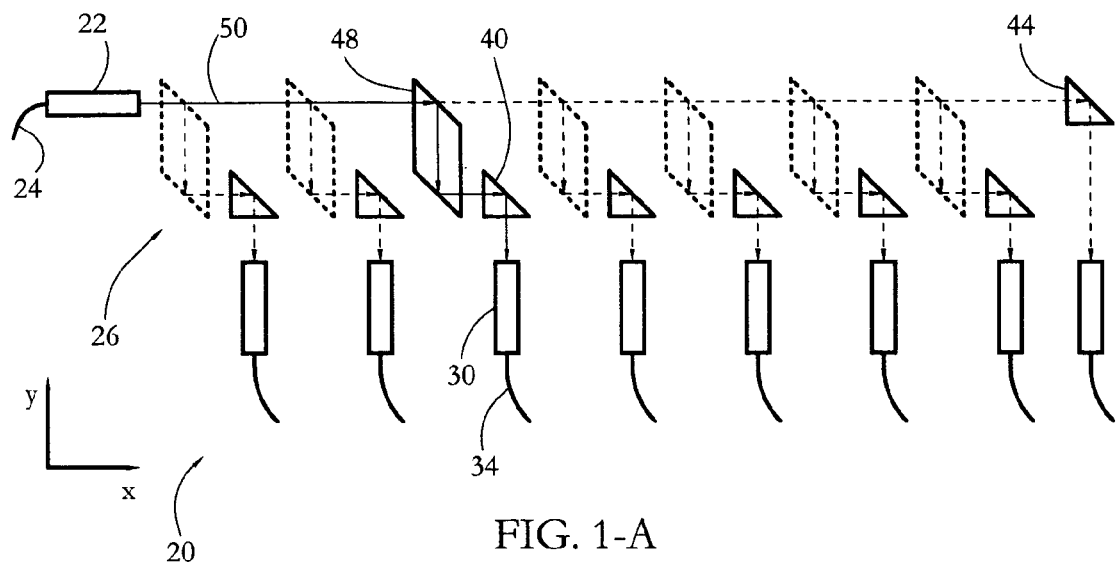
FIG. 1-A
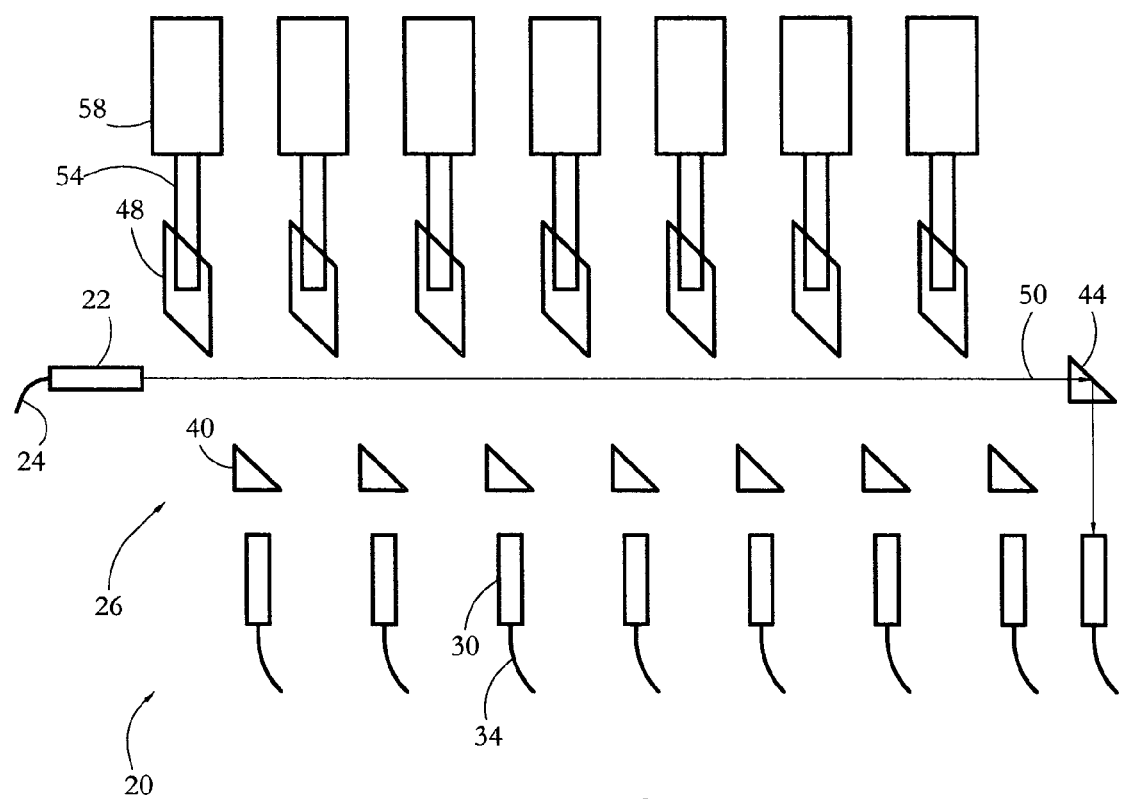
FIG. 1-B

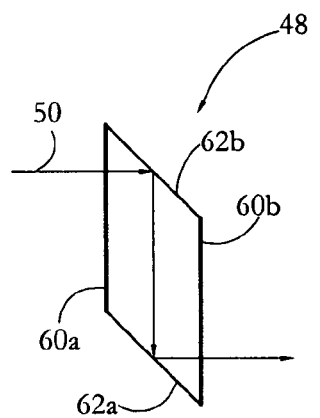
FIG. 2-A
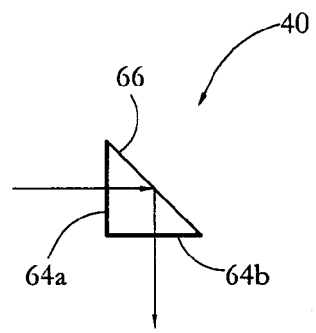
FIG. 2-B
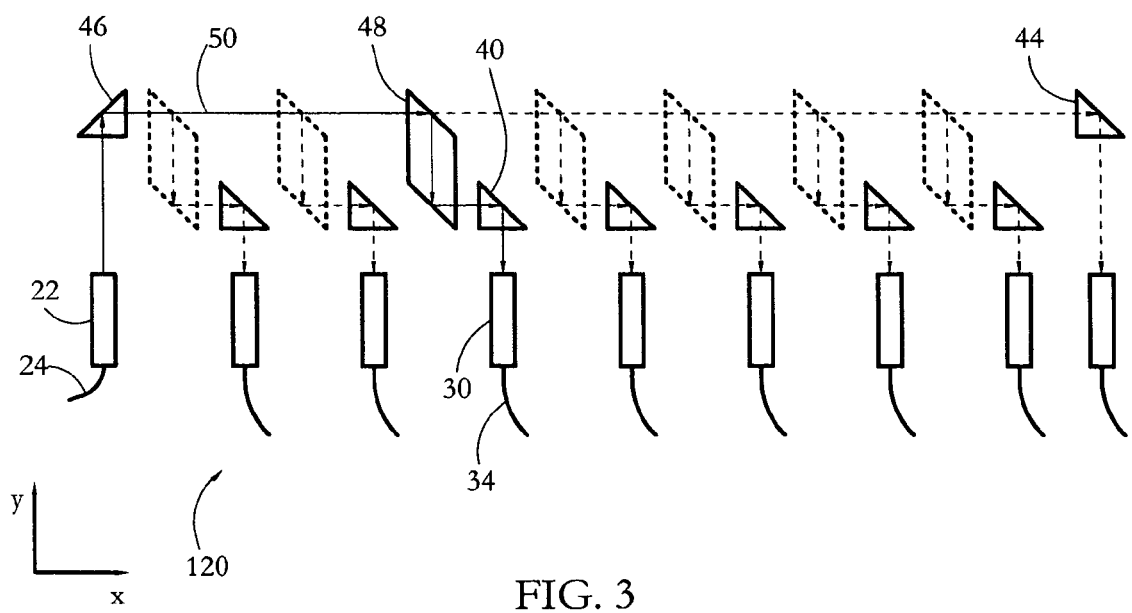
FIG. 3

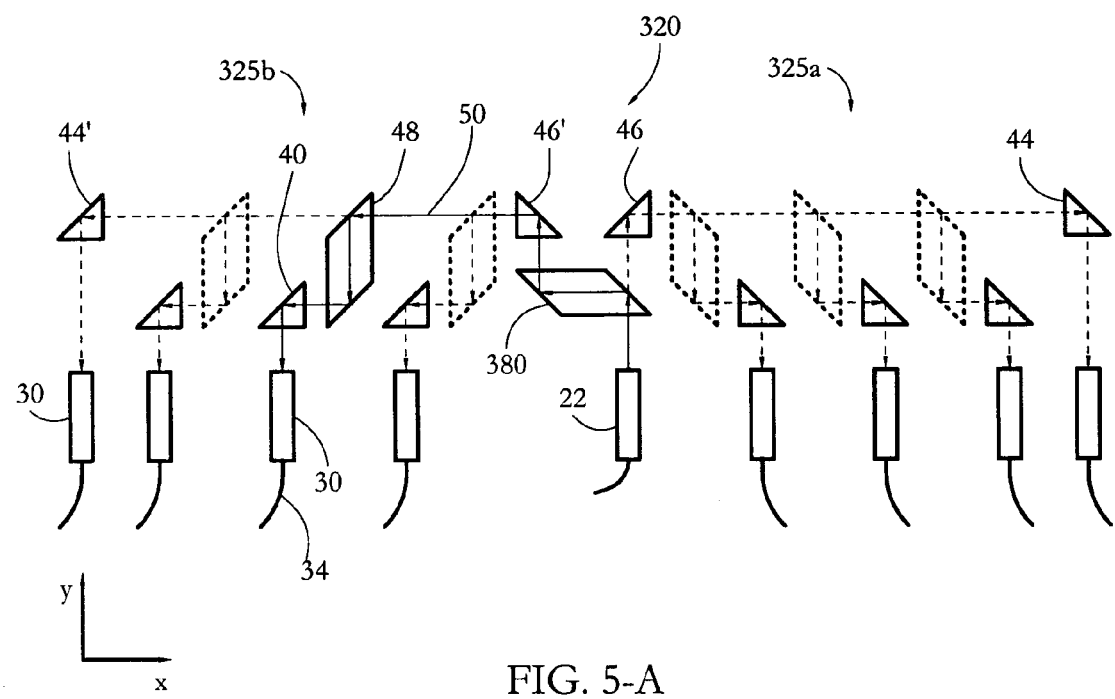
FIG. 5-A
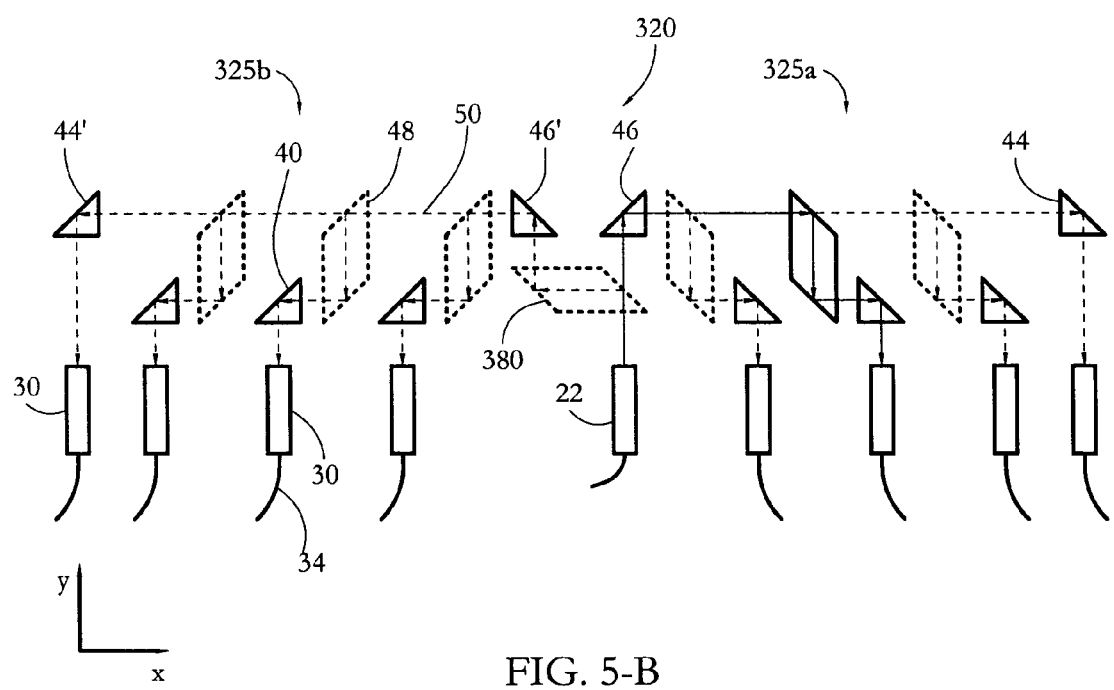
FIG. 5-B ic SYSTEMS AND
METHODS

FIELD OF THE INVENTION

The invention in general relates to fiber optic networks, and in particular to optical switches for fiber optic networks.

BACKGROUND

Optical switches are useful for a variety of applications, including fiber optic communications. In one design approach, optomechanical components are used to direct light from a desired optical input to a desired optical output. Conventional optomechanical switches include switches employing moving prisms and switches employing moving fibers, among others.

If insertion losses are to be maintained within an acceptable range, the various components of an optical switch ordinarily need to be precisely aligned relative to each other. Precise alignment requirements can significantly increase manufacturing costs, reduce manufacturing yields, and constrain the temperature ranges and vibration intensities to which the switches can be subjected.

In U.S. Pat. No. 5,999,669, Pan et al. describe an optical switch in which switching is effected by introducing a prism between collimating lenses to redirect the optical signal to an alternative lens. The prism has a cross-section defining a parallelogram, so that the optical signal is deflected twice within the prism. Pan et al. describe a 1×2 switch configuration using a single prism, and a 1×4 switch configuration using three independently movable prisms. The described 1×4 configuration may require correlating the alignment of multiple prisms during the switch assembly.

SUMMARY OF THE INVENTION

According to one aspect, the present invention provides a 1×N switch comprising: a plurality of co-planar, parallel output optical fiber collimators oriented to receive light substantially perpendicular to a longitudinal direction; and a plurality of switching units each corresponding to an output collimator. Each switching unit includes a rhomboid switching prism movable between a first position and a second position, and a fixed right-angle reflector facing the output collimator. When the switching prism is in the first position, the switching prism receives a longitudinal light beam and directs the light beam to the reflector for transmission to the output collimator. When the switching prism is in the second position, the switching prism is situated out of a path of the light beam.

According to another aspect, the present invention provides an optical switching method comprising: selecting an output optical fiber collimator of an optical switch for transmission, the optical switch including an input optical fiber collimator and a plurality of output optical fiber collimators, the plurality of optical fiber collimators being oriented to receive light substantially perpendicular to a longitudinal direction; positioning a selected rhomboid switching prism corresponding to the selected output collimator in a first position in an optical path between the input optical fiber collimator and the selected output collimator; employing the selected switching prism in the first position to direct a longitudinal light beam received from the input collimator to a fixed right-angle reflector; employing the reflector to direct light received from the selected switching prism to the selected output collimator; retracting a plurality of switching prisms corresponding to non-selected output collimators out of a path of the longitudinal light beam when the selected switching prism is in the first position; and retracting the selected switching prism to a second position out of the path of the longitudinal light beam.

A 1×N switch design according to some embodiments of the present invention allows relatively easy, independent alignment of the various optical parts used for different switch ports, and allows easily upgrading the switch configurations to larger number of ports with minimal design changes.

BRIEF DESCRIPTION OF THE DRAWINGS

The foregoing aspects and advantages of the present invention will become better understood upon reading the following detailed description and upon reference to the drawings where:

FIG. 1-A shows an optical switch comprising multiple switching units each including an output collimator and an aligned retractable prism, according to some embodiments of the present invention.

FIG. 1-B shows the optical switch of FIG. 1-A in a switching state in which all prisms are retracted, according to some embodiments of the present invention.

FIGS. 2-A–B show a rhomboid prism and a right-angle prism suitable for use in a switching unit of the switch of FIG. 1, according to some embodiments of the present invention.

FIG. 3 shows an optical switch according to some embodiments of the present invention.

FIGS. 5-A–B illustrate two switching configurations of an optical switch according to some embodiments of the present invention.

DETAILED DESCRIPTION OF THE INVENTION

Figure 4:
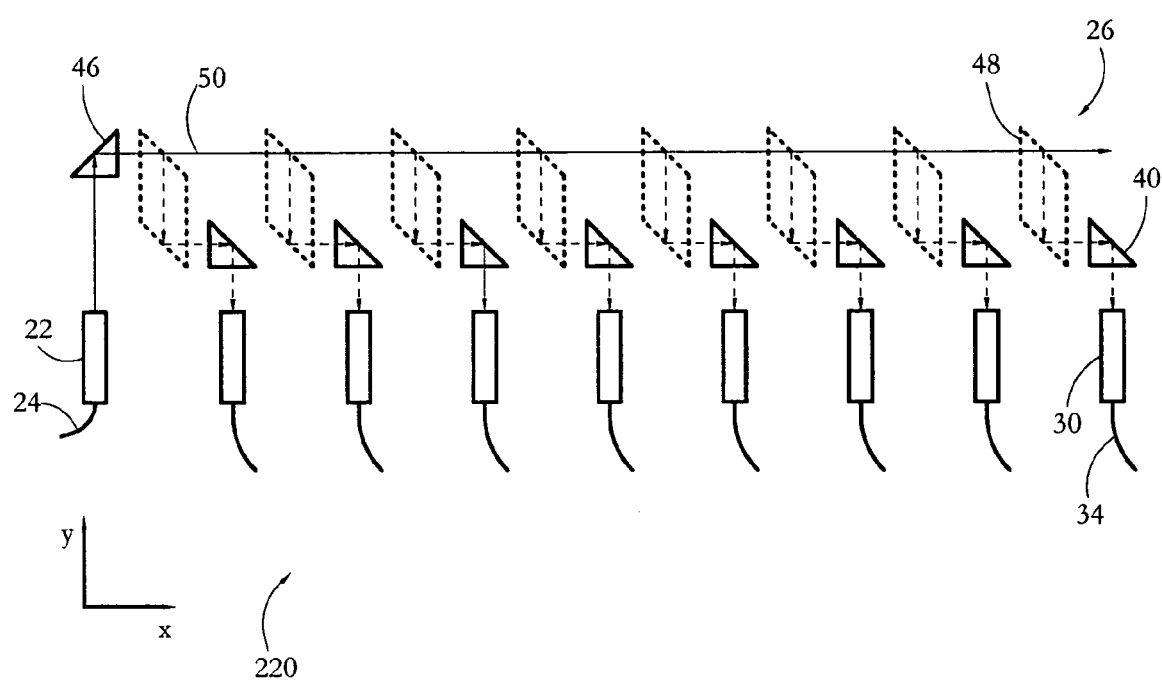
FIG. 4 shows an optical switch according to some embodiments of the present invention.

In the following description, it is understood that any recitation of an element refers to at least one element. A set of elements includes one or more elements. A plurality of elements includes two or more elements. A rhomboid prism is a prism having a cross-section shaped as an oblique-angled parallelogram with equal opposite sides, and equal or non-equal adjacent sides. For simplicity, the description below focuses primarily on 1×N switches having 1 input and N outputs, but the described configurations are optically reversible to yield switches with 1 output and N inputs. A switching unit corresponding to a collimator of a plurality of collimators is used to direct light only to/from that collimator, and not from other collimators of the plurality of collimators.

FIG. 1-A shows a 1×N optical switch 20 according to an embodiment of the present invention. Optical switch 20 includes an input fiber collimator 22, which generates a light beam 50 extending along a generally longitudinal direction denoted as the x-axis in FIG. 1-A. A plurality of parallel, co-planar output fiber collimators 30 are aligned along a longitudinal line, and face in the same direction. Each output collimator 30 is oriented along the y-direction, such that each output collimator 30 receives light traveling along the y-direction. Preferably each output collimator 30 is situated at the same height along the y-axis, although in general some collimators 30 may be positioned at different heights. In the embodiment shown in FIG. 1-A, input collimator 22 is perpendicular to output collimators 30. Input collimator 22 includes a fiber pigtail and a securely attached microlens, and is coupled to an input optical fiber 24. Collimator 22 serves as an optical input of switch 20. Output collimators 30 serve as the optical outputs of switch 20. Each output collimator 30 comprises a fiber pigtail and securely attached microlens, and is coupled to a corresponding output optical fiber 34.

A plurality of switching units 26 are aligned along the x-direction, each facing a corresponding output collimator 30. Each switching unit 26 is capable of being optically coupled to input collimator 22 in a switching state in which the corresponding output collimator 30 is selected for transmission. Each switching assembly 26 includes a fixed reflector such as a right-angle prism 40 facing its corresponding output collimator 30, and a movable rhomboid prism 48 capable of directing light beam 50 to right angle-prism 40 for transmission to output collimator 30 when prism 48 is inserted in the path of light beam 50. At any point in time, only one prism 48 may be positioned in the path of light beam 50, while the other prisms 48 are retracted out of the path of light beam 50.

FIG. 1-A illustrates a switching state in which light is directed from input collimator 22 to the third output collimator 30 shown. Solid lines denote the light beam trajectory and switching prism position corresponding to that switching state. Dashed lines denote alternative light beam trajectories and switching prism positions corresponding to alternative switching states, in which light is directed from input collimator 22 to other output collimators. FIG. 1-B shows a configuration of switch 20 in which all movable prisms 48 are retracted out of the path of light beam 50. When all movable prisms 48 are retracted, light beam 50 is incident on an end reflector such as a right-angle prism 44. Prism 44 reflects light beam 50 to the end output collimator positioned furthest away from input collimator 22. The insertion and lifting of movable prisms 48 may be driven by electromagnetic devices such as relays. In one embodiment, each prism 48 is mounted at the distal end of an arm 54, which is in turn connected to an independently-controllable electric relay 58.

FIGS. 2-A and 2-B show a rhomboid prism 48 and a right-angle prism 40, respectively. Rhomboid prism 48 has two opposite transmissive faces 60*a–b*, and two opposite reflective faces 62*a–b* oriented at an acute angle of 45° relative to transmissive faces 60*a–b*. Transmissive faces 60*a–b* are anti-reflection (AR)-coated, while reflective faces 62*a–b* are optically flat and clean. A light beam 50 incident on transmissive face 60*a* undergoes total internal reflection along reflective surfaces 62*a–b*, and exits prism 48 through transmissive face 60*b*. A light beam incident at an angle θ relative to the normal inside a material of index n will undergo total internal reflection if $$\sin \theta \geq 1/n. \quad [1]$$

For a prism made of BK7, a borosilicate glass with n=1.5, the minimum angle θ given by eq. [1] is 41.8°. If total internal reflection is to occur along both reflective surfaces 62*a–b*, the angle θ is preferably maintained within 45°±3.2°. The corresponding allowable variation in incident angle relative to the normal to transmissive face 60*a* is $$\Delta \alpha = \sin^{-1}(n \sin \theta), \quad [2]$$

which yields an allowable variation of Δα=±4.8° for n=1.5 and θ=±3.2°. A light beam incident on transmissive face 60*a* should undergo total internal reflection along both reflective surfaces 62*a–b* as long as the incident angle stays within 4.8° of the normal to transmissive surface 60*a*. The part of beam 50 entering prism 48 is parallel to the part exiting prism 48 even if the beam is not perfectly perpendicular to transmissive face 60*a*.

Right-angle prism 40 has two perpendicular transmissive faces 64*a–b*, and a hypotenuse reflective face 66 oriented at 45° relative to transmissive faces 64*a–b*. Transmissive faces 64*a–b* are anti-reflection (AR)-coated, while reflective face 66 is optically flat and clean. Ideally, the incoming light beam is perpendicular to transmissive face 64*a*, and the outgoing light beam is perpendicular to the incoming light beam. In the switch of FIGS. 1-A–B, the right angle prism 40 may be replaced with a planar mirror having a 100% reflection coating.

FIG. 3 shows an optical switch 120 according to another embodiment of the present invention. Switch 120 differs from the switch 20 shown in FIGS. 1-A–B in that input collimator 22 is disposed along output collimators 30, rather than orthogonally with respect to output collimators 30. Input collimator 22 is parallel to and co-planar with output collimators 30, and faces in the same direction. Input collimator 22 emits light along the y-axis. A reflector such as a right-angle prism 46 reflects the light beam generated by input collimator 22 into an x-axis trajectory aligned with the location line formed by output collimators 30. Input collimator 22 and reflector 46 can be thought to form an optical switch input that generates the x-axis light beam 50. The configuration of FIG. 3 has its input and all outputs on the same side of the switch. The configuration provides a relatively compact design for the switch, and allows conveniently routing the input and output optical fibers outside the switch.

FIG. 4 shows an optical switch 220 according to another embodiment of the present invention. Switch 220 differs from the switch 120 shown in FIG. 3 in that the end reflector 44 shown in FIG. 3 is replaced by an end switching unit 26 comprising a movable prism 48. By retracting all the movable prisms, switch 220 can be set to a state in which all output ports are off.

FIGS. 5-A–B show two switching configurations of an optical switch 320 according to another embodiment of the present invention. As in FIG. 1-A, solid lines denote light beam trajectories and switching prism positions corresponding to the illustrated switching states. Dashed lines denote alternative light beam trajectories and switching prism positions corresponding to alternative switching states. Optical switch 320 includes an input fiber collimator 22 situated in a central position along a line formed by input collimator 22 and output collimators 30. Optical switch 320 includes two switching sections 325*a–b*, each including 4 output collimators 30, situated on opposite sides of input collimator 22. Section 325*a* includes a longitudinal-end right-angle-reflector 44 situated at its distal longitudinal end. Section 325*b* includes a longitudinal-end right angle-reflectors 44' situated at its distal longitudinal end. Two input-side right-angle reflectors 46, 46' are positioned opposite right-angle reflectors 44, 44', respectively, at the proximal ends of sections 325*a–b*, respectively. A movable section-selection prism 380 may be positioned in the path of the light beam emitted by input collimator 22, to direct the light beam to section 325*b* through end reflector 46'. When prism 380 is retracted, the light beam emitted by input collimator 22 is directed to section 325*a* through end reflector 46. Section-selection prism 380 is perpendicular to the port-selection movable prisms 48.

FIG. 5-A illustrates a configuration in which section-selection prism 380 is inserted in the optical path of the beam emitted by input collimator 22, and light is directed to an output port within section 325b. FIG. 5-B illustrates a configuration in which section-selection prism 380 is retracted from the optical path of the beam emitted by input collimator 22, and light is directed to an output port within section 325a. The configuration of FIGS. 5-A–B essentially includes two switching stages: an inter-section switching stage including prism 380, and an intra-section switching stage including prisms 48.

A suitable method of assembling a switch such as the ones described above can be understood with reference to FIG. 3. The alignment process may start with the end output collimator 30 positioned further away from input collimator 22. All prisms 48 are first retracted out of the light beam path. The positions and orientations of input collimator 22, end output collimator 30, and right-angle prisms 44, 46 are adjusted to achieve a minimal insertion loss and to ensure that prisms 48 do not clip the light beam traveling between collimators 22, 30. Once optimal alignment is achieved, the various components are affixed to a switch mounting base. Subsequently, one prism 48 at a time is lowered to its switching position in the light beam path, and the positions and orientations of the corresponding right-angle prism 40 and output collimator 30 are adjusted to achieve a minimal insertion loss. The alignment process is repeated individually for each switching unit. For a switch such as the one shown in FIGS. 5-A–B, the alignment process described above may be performed first for section 325a, with the section-selection prism 380 retracted, and then for section 325b, with the section-selection prism 380 inserted into the light beam path. The alignment steps performed for each section are performed independently as described above for the switch of FIG. 3.

The configuration of FIGS. 5-A–B allows a reduction in the maximum distance between input and output ports, and thus a reduction in insertion loss variability between ports. In a 1×8 prototype system of the linear design shown in the preceding figures, the maximum insertion loss variation observed between different ports was a relatively-low 0.3 dB. At higher port numbers, increasing the number of output ports by increasing the maximum optical pathlength between inputs and outputs may lead to an unacceptable increase in insertion loss variability. The configuration of FIGS. 5-A–B allows the use of a relatively high number of output ports while constraining the maximum optical distance between input and output ports, and thus limiting insertion loss variations between ports. The configuration of FIGS. 5-A–B allows readily achieving port numbers on the order of 20 while maintaining low insertion loss variability.

The preferred optical switching systems and methods described above allow generating output light beams that are relatively stable in response to thermal changes and vibrations to which the switch may be exposed. The use of a rhomboid prism in the geometry described above allows achieving output beam translational shifts and angle variations that are relatively insensitive to fluctuations in the position and orientation of the switching prism. For an ideal rhomboid prism, the output light beam remains parallel to the input beam as the prism translates or rotates around its central position, while the translational shift in the beam caused by prism tilt fluctuations is relatively small. The relative stability of the output beam's orientation is particularly advantageous because insertion losses caused by misalignment with the output collimator fiber are generally more sensitive to variations in beam orientation than to variations in beam translational shift. The translational shift generated by a tilting fluctuation is on the order of $\beta L$, where L is the prism length and $\beta$ is the tilting angle. For L=2.5 mm and a tilting span of 0.1°, the light beam translational fluctuation will be on the order of 4 µm. An output beam intensity repeatability on the order of 0.05 dB was observed in a prototype system built as described above.

The use of independent, linearly-aligned switching units each including a fixed right-angle reflector and a movable rhomboid prism allows relatively easy, independent alignment of the various optical parts used for different ports, and allows easily upgrading the switch configurations to larger number of ports with minimal design changes. In the configurations described with reference to FIG. 1-A through FIG. 4, a single prism is aligned for each port, independently of prism alignments performed for other ports. In the configuration described with reference to FIGS. 5-A–B, each port performance may depend on the alignment of one or two prisms: ports in one section depend on one prism, while ports in the second section depend on two prisms, with one of the prisms shared by all ports in that section. Independent alignment for each port allows simplifying the switch assembly, readily achieving relatively low insertion losses, and employing prisms with less strict geometric tolerances for given acceptable insertion losses.

Positioning all collimators (input and output) alongside each other and facing the same side allows making the switch design relatively compact, and allows simplifying the handling of optical fibers outside the optical switch.

Relative to a design such as the 1×4 design described by Pan et al. in U.S. Pat. No. 5,999,669, the preferred multi-port configurations described above may allow reduced insertion losses, reduced switching times, improved repeatability, and improved manufacturability.

It will be clear to one skilled in the art that the above embodiments may be altered in many ways without departing from the scope of the invention. For example, the various the right-angle prisms described above may be replaced by planar reflectors. Accordingly, the scope of the invention should be determined by the following claims and their legal equivalents.

What is claimed is:

1. An optical switch comprising:
   a plurality of co-planar, parallel output optical fiber collimators oriented to receive light substantially perpendicular to a longitudinal direction; and
   a plurality of switching units each corresponding to an output collimator, each switching unit comprising:
      a rhomboid switching prism movable between a first position and a second position, and
      a fixed right-angle reflector facing the output collimator;
      wherein when the switching prism is in the first position, the switching prism receives a longitudinal light beam and directs the light beam to the reflector for transmission to the output collimator, and
      wherein when the switching prism is in the second position, the switching prism is situated out of a path of the light beam.

2. The switch of claim 1, wherein the reflector comprises a right-angle prism.

3. The switch of claim 1, further comprising an input fiber collimator oriented longitudinally, the input collimator emitting the light beam longitudinally to the plurality of switching units.

4. The switch of claim 1, further comprising:
an input fiber collimator oriented parallel to the plurality of output collimators, and
a right-angle end reflector facing the input collimator, the end reflector directing light received from the input fiber collimator longitudinally to the plurality of switching units.

5. The switch of claim 1, further comprising:
an end output fiber collimator oriented parallel to the plurality of output collimators; and
a right-angle end reflector facing the end output collimator, for directing the longitudinal light beam transversely toward the end output collimator.

6. The switch of claim 1, wherein each switching unit further comprises:
an arm having a distal region and a proximal region, the switching prism being mounted on the arm along the distal region; and
a relay coupled to the arm along the proximal region, the relay moving the switching prism between the first position and the second position.

7. The switch of claim 1, wherein the plurality of output collimators comprises more than four output collimators.

8. The switch of claim 1, wherein the plurality of output collimators comprises at least eight output collimators.

9. The switch of claim 1, wherein the switch is a 1×8 switch.

10. The switch of claim 1, wherein the plurality of output collimators face a common direction.

11. The switch of claim 1, wherein:
the plurality of switching units comprises a first section and a second section; and
the switch further comprises
an input optical fiber collimator positioned substantially between the first section and the second section; and
a section-selection reflector movable between a third position and a fourth position, wherein when the section-selection reflector is in the third position, the section-selection reflector directs light from the input collimator to the second section, and wherein when the section-selection reflector is in the fourth position, the section-selection reflector is out of a path of light emitted from the input collimator, and light from the input collimator is directed to the first section.

12. The switch of claim 1, wherein:
the plurality of switching units comprises a first section and a second section; and
the switch further comprises
an input optical fiber collimator oriented parallel to the plurality of output collimators and positioned substantially between the first section and the second section;
a first right-angle end reflector oriented to receive light perpendicular to the longitudinal direction and transmit light along the longitudinal direction to the first section;
a second right-angle end reflector oriented to receive light perpendicular to the longitudinal direction and transmit light along the longitudinal direction to the second section; and
a section-selection rhomboid prism movable between a third position and a fourth position;
wherein when the section-selection prism is in the third position, the section-selection prism directs light received from the input collimator to the second end reflector for transmission to the second section, and
wherein when the section-selection prism is in the fourth position, the section-selection prism is situated out of the path of light emitted by the input collimator, and the light emitted by the input collimator is incident on the first end reflector for transmission to the first section.

13. An optical switch comprising:
an output optical fiber collimator oriented to receive light substantially perpendicular to a longitudinal direction;
a fixed right-angle reflector facing the output collimator; and
a rhomboid switching prism movable between a first position and a second position;
wherein when the switching prism is in the first position, the switching prism receives a longitudinal light beam and directs the light beam to the reflector for transmission to the output collimator; and
wherein when the switching prism is in the second position, the switching prism is situated out of a path of the light beam.

14. An optical switch comprising:
a plurality of co-planar, parallel output optical fiber collimators oriented to receive light substantially perpendicular to a longitudinal direction; and
a plurality of switching units each corresponding to an output collimator, each switching unit comprising:
switching means movable between a first position and a second position, and
a fixed right-angle reflector facing the output collimator;
wherein when the switching means is in the first position, the switching means receives a longitudinal light beam and directs the light beam to the reflector for transmission to the output collimator, and
wherein when the switching means is in the second position, the switching means is situated out of a path of the light beam.

15. An optical switching method comprising:
selecting an output optical fiber collimator of an optical switch for transmission, the optical switch including an input optical fiber collimator and a plurality of output optical fiber collimators, the plurality of optical fiber collimators being oriented to receive light substantially perpendicular to a longitudinal direction;
positioning a selected rhomboid switching prism corresponding to the selected output collimator in a first position in an optical path between the input optical fiber collimator and the selected output collimator;
employing the selected switching prism in the first position to direct a longitudinal light beam received from the input collimator to a fixed right-angle reflector;
employing the reflector to direct light received from the selected switching prism to the selected output collimator;
retracting a plurality of switching prisms corresponding to non-selected output collimators out of a path of the longitudinal light beam when the selected switching prism is in the first position; and
retracting the selected switching prism to a second position out of the path of the longitudinal light beam.

16. The method of claim 15, wherein the reflector comprises a right-angle prism.

17. The method of claim 15, wherein the input collimator is oriented longitudinally.

18. The method of claim 15, wherein the input collimator is oriented parallel to the plurality of output collimators, and the method further comprises employing a right-angle end reflector facing the input collimator to direct light received from the input fiber collimator longitudinally to the plurality of switching units.

19. The method of claim 15, further comprising, after retracting the selected switching prism, employing a right-angle end reflector to direct the longitudinal light beam to an end output optical fiber collimator oriented parallel to the plurality of output collimator.

20. The method of claim 15, wherein the plurality of output collimators comprises more than four output collimators.

21. The method of claim 15, wherein the plurality of output collimators comprises at least eight output collimators.

22. The method of claim 15, wherein the switch is a 1×8 switch.

23. The method of claim 15, wherein the plurality of output collimators face a common direction.

24. The method of claim 15, further comprising employing a section-selection prism to select a first section of the plurality of output collimators for transmission when the section-selection prism is in a first position, and to select a second section of the plurality of output collimators for transmission when the section-selection prism is in a second position.

25. An optical switch comprising:
   a plurality of co-planar, parallel input optical fiber collimators oriented to emit light substantially perpendicular to a longitudinal direction; and
   a plurality of switching units each corresponding to an input collimator, each switching unit comprising:
      a rhomboid switching prism movable between a first position and a second position, and
      a fixed right-angle reflector facing the input collimator;
      wherein when the switching prism is in the first position, the switching prism receives a light beam emitted by the input collimator and reflected by the reflector, and directs the light beam along the longitudinal direction, and
      wherein when the switching prism is in the second position, the switching prism is situated out of a path of the light beam.

26. An optical switch comprising:
   a first optical fiber collimator;
   a plurality of co-planar, parallel second optical fiber collimators each oriented perpendicular to a longitudinal direction; and
   a plurality of switching units each corresponding to a second collimator, each switching unit comprising:
      a rhomboid switching prism movable between a second position and a second position, and
      a fixed right-angle reflector facing the second collimator;
      wherein when the switching prism is in the first position, the reflector is optically between the second collimator and the switching prism, and the switching prism optically couples the first collimator and the second collimator, and
      wherein when the switching prism is in the second position, the switching prism does not optically couple the first collimator and the second collimator.

* * * * *